Figure 1:
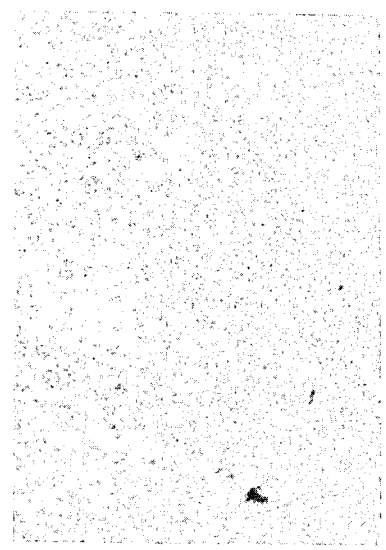
Figure 2:
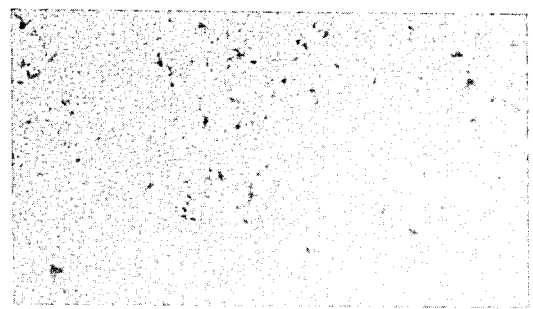

United States Patent [19]

Albertelli et al.

[11] Patent Number: 4,843,103

[45] Date of Patent: Jun. 27, 1989

[54] FOAMED PLASTIC MATERIALS

[75] Inventors: Aldino Albertelli; Lothar M. Hohmann, both of London; Anthony N. Curtis, Dorchester, all of England

[73] Assignee: Company "A" (Foam) Limited, London, England

[21] Appl. No.: 847,320

[22] Filed: Apr. 2, 1986

Related U.S. Application Data

[63] Continuation of Ser. No. 697,009, Jan. 31, 1985, which is a continuation of Ser. No. 271,364, Jun. 8, 1981, abandoned, which is a continuation-in-part of Ser. No. 74,318, Sep. 11, 1979, abandoned.

[30] Foreign Application Priority Data

Jul. 14, 1978 [GB] United Kingdom ............... 36820/78

[51] Int. Cl.$^4$ .............................................. C08J 9/12
[52] U.S. Cl. .................... 521/83; 428/318.4; 521/88; 521/91; 521/92; 521/100; 521/117; 521/122; 521/123; 521/181
[58] Field of Search .................... 521/181, 88, 91, 92, 521/100, 117, 122, 123, 83

[56] References Cited

U.S. PATENT DOCUMENTS

| | | | |
|---|---|---|---|
| 2,446,429 | 8/1948 | Nelson et al | 521/181 |
| 2,653,139 | 9/1953 | Sterling | 521/181 |
| 3,813,356 | 5/1974 | Livremont et al. | 521/181 |
| 4,067,829 | 1/1978 | Garrett | 521/181 |
| 4,102,832 | 7/1978 | Weissenfels et al. | 521/181 |
| 4,111,911 | 9/1978 | Weissenfels et al. | 521/181 |
| 4,166,162 | 8/1979 | Weissenfels et al. | 521/181 |
| 4,419,460 | 12/1983 | Ho | 521/181 |
| 4,521,543 | 6/1985 | Rühl et al. | 521/181 |
| 4,532,261 | 6/1985 | Rühl et al. | 521/181 |
| 4,595,710 | 6/1986 | Albertelli et al. | 521/181 |

Primary Examiner—Morton Foelak
Attorney, Agent, or Firm—Browdy & Neimark

[57] ABSTRACT

Foamed resinous products having excellent fire resistance, high thermal insulation and good resistance to heat are obtained at temperatures as low as room temperature and without the need for an added blowing agent by forming a mixture of a phenolic resole having a specified reactivity, an acid hardener for the resole and, uniformly dispersed through the mixture of resole and hardener, at least 20% by weight of a finely divided inert and insoluble particulate solid; products capable of being employed as wood-substitutes are obtained when a dihydric compound is included in the mixture and the solid is talc, fly ash and/or a hydraulic cement.

14 Claims, 3 Drawing Sheets

FOAMED PLASTIC MATERIALS

This is a continuation of application Ser. No. 697,009, filed Jan. 31, 1985, itself a continuation of application Ser. No. 271,364 of June 8, 1981, the latter of which is a CIP of Ser. No. 074,318, filed Sept. 11, 1979, the latter two having been abandoned without prejudice.

This invention relates to foamed plastics materials based on phenolic resins.

Foamed plastics materials are widely used in industry, especially for thermal insulation in buildings and as shock absorbent packing materials for packing delicate articles for transport. They have also found use widely in other outlets such as soft furniture.

Polystyrene and polyurethane foams are widely used but are combustible. Even when modified with flame retardants, they give off noxious poisonous fumes or dense smoke when exposed to flame and are a serious hazard in fire. For these reasons, there is a growing prejudice against their use, especially in private dwellings.

Foamed phenolic resins have also been available for many years and can be formulated so as not to support flame and to have a lower tendency than polystyrene or polyurethane foams to generate toxic fumes in the presence of flame. The basic material, i.e. the phenolic resin, is also relatively cheap. Nevertheless, hitherto they have not gained as wide acceptance in industry as polyurethane inter alia because of their generally poor physical strength; they tend to be brittle and friable and easily crushed and are generally useless as structural materials. Further, while they can be manufactured as simple shapes such as slabs and blocks more complex shapes cannot readily be formed by moulding and have to be produced from the slabs or blocks by a further operation such as machining.

A further reason for the failure of phenolic foam to gain wide acceptance is that the process for producing the foam is difficult to control, especially in the production of articles such as sheets where at least one of the dimensions is relatively small. This is believed to be due to the problems associated with dissipating the heat of the exothermic reaction.

This invention is concerned with the production of valuable expanded or foamed products from compositions based on phenolic resoles of the kind which are cured by the action of acid hardeners. By a "foamed product" or "a foam" we mean a product which has been obtained by expanding a resinous mixture and which has a volume at least twice that of the unexpanded mixture from which it is formed.

The state of the art on the production of foamed phenolic resins is well summarised in Chapter 11 of the reference work entitled "Plastic Foams" edited Saunders and Frisch and published by Dekker in 1972. Other publications which have been taken into account in the preparation of this application are U.S. Pat. Nos. 2,629,698, 2,653,139, 3,740,358, 3,298,973, 4,067,829, 2,933,461, 3,271,331, 4,001,148, 3,502,610 and 3,813,356, British Patents 578838, 652756, 1088053 and 1240487, French Patent Specification 1582096, German OLS 1694009, Plastics volume 29 No. 315 of January 1964 at page 84 and volume 29 No. 321 at pages 62 to 65, German Plastics volume 51 No. 11 November 1961 at page 104 and International Polymer Science and Technology volume 1 No. 8 1974 pages 78 to 80.

It has been known for decades that unfoamed moulded articles in phenolic resin may be obtained by the action of an acid hardener on a phenol/formaldehyde condensation product of the kind known as a phenolic resole. The reaction is exothermic and it has also been known since the earliest days of the development of phenolic resins that if sufficiently forcing conditions are used, e.g. by employing a very reactive resole and/or by the application of heat, low density expanded products may be obtained. The expansion is effected by steam generated during the exothermic reaction from water formed as a by-product of the reaction. However, the resultant expanded products, which are sometimes known as "boiled resins", are typified by a coarse and non-uniform cellular structure which is largely open-celled and also contains large voids or blow holes. The cellular structure comprises cells which vary widely and randomly in size throughout the structure from about 0.1 mm or less to about 10 mm across or more, and the products also contain randomly distributed "below holes" which can be as much as 25 mm long or more. Because of their relatively coarse and non-uniform structure and the presence of the blow holes, the physical properties of these "boiled resins" vary and are unpredictable. They have little commercial value and are of no interest as structural materials.

Accordingly, attempts to produce phenolic foams by this method were largely abandoned many years ago and other methods have been developed, all of which require the addition to the mixture of resole and acid hardener of a chemical to provide the gas for the foaming action.

It is also generally found to be necessary to include a surfactant with the blowing agent in order to obtain useful foams.

The chemical, which is known as a "blowing agent" is either a volatile liquid which vaporises under the conditions of the curing reaction or a compound which decomposes or reacts with another component of the mixture, usually the acid hardener, under the conditions of the curing reaction to generate a gas.

Phenolic foams obtained by the use of blowing agents have achieved commercial success e.g. as thermal insulation but the composition of the foam-forming mixture, and the nature of the resole in particular, and/or the conditions of the foam-forming reaction have to be chosen such that in the absence of the blowing agent substantially no foaming will occur, since otherwise the unsatisfactory cellular structure associated with "boiled" resins is introduced into the products.

Examples of methods for the production of foams employing various kinds of blowing agents and of the surfactants that are used, are given in the publications referred to above.

The first method, illustrated for example, in Plastics, Vol 29, No 315 of January 1964 at page 84, Offenlengungschrift Specification 1694009 published in 1971, and French Patent Specification 1582096, involves using an additive, e.g. a low boiling liquid hydrocarbon such as butane, pentane and hexane or other low boiling liquid organic compound such as petroleum ether, which produces a gas by volatilisation during hardening. Heat is required for the foaming and curing reaction and reaction times of 2 to 4 hours are mentioned.

The second method employs a compound such as sodium carbonate which decomposes under the influence of the acid hardener or heat or both to yield a gas. Such a method is suggested, for example, in German Plastics, Vol 51, No 11, November 1961 at page 104; Plastics, Vol 29, No 321 at pages 62 to 65, British Patent Specification 652756 and the above-mentioned French patent specification.

The third method employs a component which reacts with the acid hardener to generate hydrogen. This method is described, for example, in International Polymer Science and Technology, Vol 1, No 8, 1974, pages 78–80 where the component employed is aluminium powder. The use of metal powders is also suggested in the above-mentioned French specification.

Most or all of the foamed phenolic resin products available on the market at present are manufactured by one or other of these methods, and generally the first method. However, all of these methods have disadvantages. Thus, the volatilisable compounds employed in the first method can be expensive and also present handling hazards, and the fire-resistant properties of the product can be adversely affected where the blowing gas, which is to some extent retained in the cells of the product, is inflammable. In the presence of a fire, the trapped gases expand rapidly and sometimes explode and shoot flaming debris from the product thereby presenting a risk of spreading the fire.

The preferred blowing agents for the second method tend to be alkaline, thereby neutralizing the acid hardener and requiring more of it to achieve a proper cure or even preventing a proper cure. Furthermore, the residues of these blowing agents may also have an undesirable and sometimes unpredictable effect on the properties of the product.

The third method is disadvantageous because the metal powders are relatively expensive, substantially increase the density of the foam and also interfere with its otherwise valuable electrical insulation and heat insulation properties.

We have now found a method of producing a foamed phenolic resin composition which avoids the need to use an added blowing agent and which can be employed to provide foamed resin material having very valuable properties, such as a wide range of densities e.g. from 50 to 500 Kg/m$^3$, a fine texture of substantially uniform pore (cell) size, excellent fire-resistance, high thermal insulation and good resistance to heat. Moulded products are readily obtainable from the foam-forming composition in simple fashion and without the need for sophisticated or expensive equipment.

Figure 3:
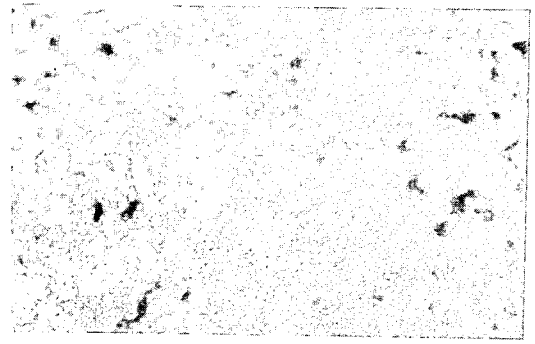
Figure 4:
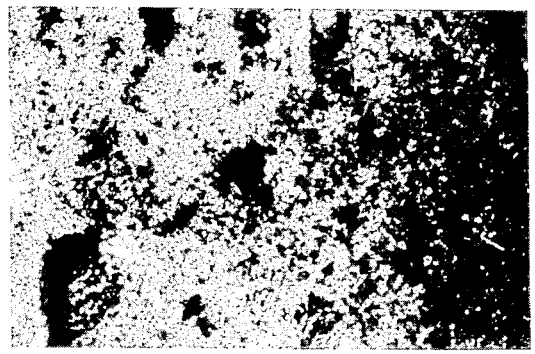
Figure 5:
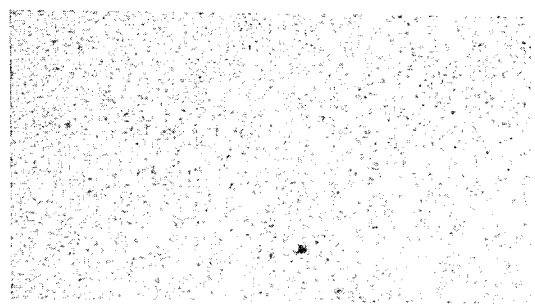

FIGS. 1–7 of the accompanying drawings are photographs, at a linear magnification of approximately 2.5, of typical core sections of phenolic foams produced by experiments A to E of Example 25 and Experiments A and B of Example 26. FIGS. 1, 2, 5, 6 and 7 are photographs of foams in accordance with the present invention, and FIGS. 3 and 4 are photographs of comparative foams. In a preferred embodiment which employs a modified resole, products may be obtained with a particularly desirable combination of physical properties, notably valuable energy adsorption characteristics, good strength and relatively low friability.

Thus, by means of the invention, products can be obtained which are valuable in the building industry not only for thermal insulation but also as constructional materials such as panels and roofing and even as load-bearing materials such as building blocks. By suitable adjustment of the variables employed in the process, products can be obtained which combine the above properties with a density similar to and handling characteristics of wood in that they can be sawn, cut and abraded and will receive and hold screws and nails, in some cases even better than wood, in that there is less tendency to split.

The foamed products of the present invention are in general substantially rigid foams.

By means of the present invention there is provided a method of producing a foamed phenolic resin product which avoids the need for added blowing agent and yet produces foamed products having a cellular texture of substantially uniform cell size and largely comprising cells whose diameter does not exceed about 4 to 5 mm and generally is substantially less, e.g. 2 mm or 1 mm or less and is substantially free of blow holes. The products have valuable physical and fire resistant properties and are of interest as structural materials.

In accordance with the method, the expansion or foaming is effected essentially by gas obtained by the volatilisation, during the curing reaction, of compounds present in the resole and/or generated by the curing reaction. However, the abovementioned disadvantages that have been associated with the production of phenolic foams without the use of an added blowing agent are avoided and by means of the invention valuable foamed resin materials can be obtained which are characterised by a substantially uniform cell size and the substantial absence of blow holes.

In general in the foams of this invention at least 80% or even 90% of the cells of a typical cross section of a core sample of the foam have a diameter within the range of from 30% to 200%, and usually 50% to 150%, of the mean diameter, and not more than about 1% or 2% or perhaps 5%, at most, of the area of the cross section comprises cells having a diameter exceeding about 300% of said mean diameter.

The mean diameter will depend on the formulation and foaming conditions but is generally in the range of from about 0.1 mm or 0.2 mm to about 1 or 2 mm.

In accordance with the present invention, there is provided a method for the production of a foamed phenolic resin material, the method comprising (i) in the absence of added blowing agent effecting a curing reaction between (a) a liquid phenolic resole having a reactivity number (as herein defined) of at least 1 and (b) a strong acid hardener for the resole, in the presence of (c) a finely divided inert and insoluble particulate solid which is present in an amount of at least 5%, preferably 20%, by weight of the liquid resole and is substantially uniformly dispersed through the mixture containing resole and hardener; the temperature of the mixture containing resole and hardener due to any applied heat not exceeding 85° C., and preferably not exceeding 65° C. for most cases, the said temperature and the concentration of the acid hardener being such that at least one compound present in the resole or generated as a by-product of the curing reaction is volatilised within the mixture before the mixture sets, and (ii) recovering a foamed phenolic resin product having a cellular texture of substantially uniform cell size and being substantially free of blow holes.

In accordance with another aspect of the invention, a method is provided for producing an article moulded in heavily filled foamed phenolic resin and suitable for use as a structural material, without the need to employ added blowing agent. The method comprises (i) in a mould and in the absence of added blowing agent effecting a curing reaction between (a) a liquid phenolic resole having a reactivity number (as herein defined) of at least 1 and (b) a strong acid hardener for the resole, in the presence of (c) a finely divided inert and insoluble particulate solid which is present in an amount of from 50% to 200% by weight of the liquid resole and is substantially uniformly dispersed through the mixture containing resole and hardener; the temperature of the mixture containing resole and hardener due to any applied heat not exceeding 85° C. and the said temperature and the concentration of the acid hardener being such that at least one compound present in the resole or generated as a by-product of the curing reaction is volatilised within the mixture before the mixdture sets and (ii) recovering a moulded article of filled foamed phenolic resin.

An important feature of the invention is that it permits the production of foamed resin products having a wide range of densities, e.g. 50 to 500 Kg/m$^3$ and is particularly suitable for the production of structural materials having moderate densities in the range 100 to 500 Kg/m$^3$, especially 150 to 500 Kg/m$^3$, and which are particularly suitable for use in the building industry.

Another important feature of the invention is that it permits the production of non-punking foams. One serious disadvantage of phenolic foams is their tendency to punk as defined in, for example, U.S. Pat. Sp. No. 3298973.

Proposals have been made in the past for producing nonpunking phenolic foams but these have involved unusual catalysts. By means of the present invention, phenolic foams which are nonpunking and have outstanding resistance to heat and flame can be produced using conventional acid hardeners.

Yet a further important feature of the invention is that it provides a means by which articles of complex shape and fine detail may be moulded directly in phenolic foam without the need for sophisticated or expensive equipment.

Another feature of the invention is that the foamed products produced thereby have high thermal insulation.

A further feature of the invention is that moulded articles can be obtained which contain 50% by weight or even more, e.g. up to 200% by weight, of a filler, based on resole.

Yet a further feature of the invention is that foams may be produced which have excellent fire resistance.

Another feature of the invention is that the foam may be produced in the form of sheets and boards by moulding using relatively simple and cheap equipment, e.g. rubber moulds, and without the need to apply pressure.

For structural applications and other applications where strength and rigidity of the article moulded from the foam are important, it is preferred that the particulate solid be present in an amount of 50 to 200 parts, more preferably 50 to 150 parts, by weight, per 100 parts of the resole, that the mixture of resole and solid is at a temperature of from 10° to 50° C. and that the mixture expand to from about twice to preferably about four times its volume in the unexpanded state. It is further preferred that the mixture include a dihydric compound as described in greater detail below.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and subsituted, usually alkyl-substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4–2.0 to 1.

In accordance with the preferred embodiment referred to above, the mixture also contains a compound having two active H atoms (dihydric compound) which will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols-e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2–6 atoms between OH groups.

The resole may comprise a solution of the phenol-/aldehyde reaction product in water or in any other suitable solvent or in a solvent mixture which may or may not include water. Where water is used as the sole solvent, it is preferred to be present in an amount of from 15 to 35% by weight of the resole, preferably 20 to 30%. Of course the water content may be substantially less if it is used in conjunction with a cosolvent, e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66–67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole must have a reactivity number of at least 1 for useful foamed products to be produced by the method of the invention, and preferably the resole has a reactivity number of at least 5, most preferably at least 10.

The pH of the resole, which is generally alkaline, is preferably adjusted to about 7, if necessary, for use in the process of the invention, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

For certain applications and in particular, for example, in applications which require the mixture of resole, hardener and solid (c) to be poured e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5–20 poises. Below 5 poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85° C.

If the temperature of the mixture exceeds 85° C. before addition of the hardener, it is difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However, we have found that at temperatures much above 75° C., even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range appears to depend to some extent on the nature of the solid (c). For most solids it is from 25° to 65° C. but for some solids, in particular wood flour and grain flour, the preferred range is 25° to 75° C. The most preferred temperature range is 30° to 50° C. Temperatures slightly below ambient, e.g. down to 10° C. can be used, if desired, but no advantage is gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependent on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin.

The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. For use with the preferred temperature range of 25°–75° C. and a resole having a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

It may be necessary to make some adjustment of the hardener composition in accordance with the nature, especially shape and size, of the mould and this can be established by experiment.

An important aspect of the invention is that by suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor which controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water which, in the method of the present invention, are at least partially volatilised.

An essential feature of the invention is that the curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

Although we do not wish to be bound by this theory, it is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. However, the effect of the solid is not merely one of nucleation since the use of an amount of the solid which would normally be appropriate for nucleation is insufficient in the process of the present invention to produce a useful foam. Thus it is believed that the presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the ceoncentration of low grade ores in metallurgy. A further contribution of the inert solid may be that it provides a heat sink, moderating the effect of the exotherm. In any event, as illustrated in Examples 1, 28 and 29 below the presence of the solid (c) is essential to the formation of the product. To achieve the desired effect, the solid should be present in an amount of not less than 5% by weight based on the weight of the resole, and usually not less than 20%.

Any finely divided particulate solid which is insoluble in the reaction mixture appears to be suitable, provided it is inert and does not act as a blowing agent. The solids may be organic or inorganic (including metallic), and crystalline or amorphous. Even fibrous solids have been found to be effective, although not preferred.

Examples are clays, clay minerals, talc, vermiculite metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates of alkali metals, are preferably avoided because of their tendency to react with the acid hardener. Solids such as talc, however, which have a very mild alkaline reaction, in some cases because of contamination with more strongly alkaline materials such as magnesite, are acceptable, provided of course that they do not act as blowing agents in the foam-forming process Some materials, especially fibrous materials such as wood flour, can be absorbent and it may therefore be necessary to use generally larger amounts of these materials than nonfibrous materials, to achieve valuable foamed products.

The solids preferably have a particle size in the range 0.5 to 800 microns. If the particle size is too great, the cell structure of the foam tends to become undesirably course. On the other hand, at very small particle sizes, the foams obtained tend to be rather dense. The preferred range is 1 to 100 microns, most preferably 2 to 40 microns. Uniformity of cell structure appears to be encouraged by uniformity of particle size.

Mixtures of solids may be used if desired.

Preferably, the finely divided solid (c) has a density which is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency which is still strong and capable of supporting loads. The products also have excellent thermal insulation and energy absorption properties and are particularly suitable for use as wood substituents. The preferred amount of such materials is from 20 to 200 parts by weight per 100 parts by weight of resole.

Another class of solids which is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If the finely divided inert particulate solid is satisfied at least in part by a finely divided metal powder, electrically conducting properties can be obtained and the foamed product can even be electroplated. The metal powder is preferably used in amounts of from 50 to 250 parts per 100 parts by weight of resole. It will be understood that metal powder provided as or as part of the finely divided inert particulate solid must not be such as to act as a blowing agent in the foam-forming process.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs on curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

In a modification of the invention, conventional blowing agents may also be included to enhance the foaming reaction, e.g. low boiling organic compounds of substances, including finely divided particulate solids, which decompose or react to produce gases.

In the process of this invention, foamed products are obtained without the need to add conventional blowing agents and it has been found that adding such agents in amounts such as would normally be used to obtain foamed products can have an adverse effect on the foaming reaction or on the structure and properties of the resultant foam. However, the inclusion of such blowing agents in small amounts which do not have a adverse effect on the foaming reaction or the structure and properties of the resultant foam is not excluded although it is found that the foams thereby produced tend to punk.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid (c) and then heating the mixture. Preferably the solid (c) is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

An important feature of the invention is that mouldings of complex shape can readily be obtained. Open or closed moulds may be used but it is important that the mould is not such as to act as a heat sink to the extent that the rate of heat loss from the mixture is so great that volatilisation of small molecules in the resole and/or produced by the curing reaction is suppressed.

Thus, mould designs which result in a large surface area of the moulding composition (relative to the volume of the composition) being exposed to air at ambient temperature or to a mould surface which is a good conductor of heat and which is at a temperature which is low compared to that reached by the moulding composition during the curing reaction, should preferably be avoided.

Nevertheless, it is a particular feature of the invention that relatively thin-section mouldings of large surface area can readily be obtained. The preferred method is to arrange the mould with the plane containing the two largest dimensions horizontal, or preferably at a small angle to the horizontal to assist the escape of any excess gas produced during the foaming and curing. If only one of the large faces of the moulding is to be contoured, this is preferably formed against the bottom face of the mould. If the opposite face is also to be contoured, then the mould should be closed by a top plate which is also appropriately contoured and the foaming should be against a back pressure which may be provided e.g. by employing more of the foam-forming composition than is required to fill the mould after foaming or by permitting the top plate to float. One method of permitting escape of excess gas generated during moulding is to locate the top plate slightly above the top edges of the mould to leave a gap. However, the edges of the moulding may thereafter require a trimming operation. Another method is to provide vents at suitable locations on the mould surface.

Mouldings of e.g. up to 10 ft by 4 ft or more and less than 1 inch thick can be obtained by this method.

If the mould design is such that heat loss from the mixture is substantially non-uniform through the body of the mixture, the cell structure of the foam may vary through the body of the product.

So far as concerns the material from which the mould is formed, preferred mould materials are wood and plastic, e.g. glass fibre reinforced resin. Plaster, rubber or elastomeric moulds may also be used. Metals should generally be avoided unless heated moulds are used.

An advantage of the invention, however, is that in general provided mould surfaces having low thermal conductivity are used it is not necessary to heat the moulds, even for the production of thin slabs.

A further advantage of the invention is that with mixtures which are sufficiently fluid, hollow articles of complex shape may be produced by slush moulding. For example, statues, figurines and human heads, arms, legs and other parts of the human body may be reproduced in remarkable detail, e.g. for use in the production of mannequins.

It is a particular feature of the foamed products of the present invention that they can be demoulded without damage even in the absence of a mould release agent whereas one difficulty with conventional phenolic foams is that their strength is such that demoulding them is a problem except from moulds of the simplest shape.

A further advantage of the invention is that by choice of suitable conditions, the mixtures can be caused to produce foamed products which are self-skinned. This may be achieved, for example, by heating the mould surface to such a temperature that the mixture in the immediate vicinity thereof sets hard before any volatilisation can occur or preferably, by maintaining the mould surface at a sufficiently low temperature that volatilisation is suppressed in the mixture in the immediate vicinity thereof. In many cases, using a mould at ambient temperature is sufficient, especially where rotational or slushing moulding is employed.

If desired, at least a part of the mould surface may be coated e.g. with a gel coat which is preferably phenolic resole-based and which may be reinforced, e.g. with glass fibres or other fibrous materials which may be in the form of tissues, mats, woven fabrics or rovings. Also materials or objects may be bonded on to or into the foamed product by locating them appropriately in the mould and causing the mixture to foam and set in contact with them. By this means, for example, laminated products may be obtained with a layer of the foamed resin bonded to a layer of other material or sandwiched between layers of other materials which may be the same or different and may be e.g. plastics, wood e.g. plywood or veneer, metal e.g. aluminum foil, or steel sheet, cement products e.g. concrete, etc.

In general, no adhesive is required.

For example, a laminate of a layer of the foamed material bonded on at least one face to a waterproof membrane such as a conventional waterproof roofing membrane, may be obtained in this manner. Excellent bonding may be achieved between the foamed material and such waterproof membranes.

Also, fixing means such as clips or bolts can be moulded into the foam in this manner.

Foamed products can be obtained by the present invention having a wide range of densities and other properties, and suitable for use in a wide variety of applications from packaging to thermal insulation and to structural building applications such as building blocks, panels, roofing members such as tiles or slabs, and architectural mouldings.

By means of the invention, foamed products may be obtained, particularly where minerals such as talc or fly ash, or hydraulic cement fillers such as plaster are used, which are characterised by good resistance to heat and the spread of flame and it is possible to produce products which are zero-rated for fire resistance and the spread of flame whereby they may be used, for example, for or in structural components such as walling or partitioning in domestic buildings or for or in doors, partitions or cladding or for decorative purposes such as in wall or ceiling tiles.

The foamed products obtained by the invention are generally characterised by good thermal insulation properties and are suitable for use, for example, in pipe lagging and heat shields and in the production of roofing for both flat and pitched roofs, e.g. in roofing tiles and sheet roofing.

Where the resoles contain a dihydric compound as described above and the solid (c) is selected from minerals such as talc or fly ash and hydraulic cements such as gypsum or plaster, moulded products may be obtained which can reproduce even complex mould surfaces in fine detail and yet which have densities and working characteristics resembling wood in that they may be sawn, cut and abraded and receive and hold even large nails and screws. They are therefore particularly suitable for use as architectural mouldings such as cornices, ceiling decorations, architraves, door and window surrounds and mouldings etc., where they will be cheaper than wood mouldings and less fragile and more easily handled than mouldings in fibrous plaster. They are also suitable as a replacement for wood in other fields such as furniture and fittings.

Foamed products obtained from resoles containing a dihydric compound are also less friable than conventional phenolic foams of corresponding density.

By suitable choice of finely divided materials, e.g. finely divided lead, products which ar particularly suitable for sound insulation e.g. as in partitioning, or in casings for machinery and engines, may be produced. By use of finely divided lead, relatively light-weight materials having radioactive shielding properties can also be produced. The finely divided lead may advantageously be used together with another suitable solid e.g. talc or plaster.

Light weight concrete structures cab be obtained by including in a fluid concrete mix foamed phenolic resin spheres made by the process of this invention.

The invention is now illustrated by the following Examples in which all parts are by weight unless otherwise indicated.

EXAMPLE 1

In a first experiment 100 parts by weight of a poly (alkylene ether)·diol-containing aqueous resole (Resole A) having a solids content of 80% and a reactivity number of approximately 12 and sold commercially by Abrasive Products Limited of Wolverhampton, England, as PL 12/1663 were mixed with 15 parts of a 67% by weight solution of p-toluene sulfonic acid (Hardener solution X) and allowed to cure at room temperature. The product was a toffee-coloured substantially transparent resin which contained no evidence of foaming.

In a second experiment, 100 parts by weight of the same resole were mixed with 25 parts by weight of dry finely divided talc purchased as "Talc 300" from English China Ltd. No foaming or curing occurred.

In a further experiment, a portion of the same talc was mixed with 15 parts by weight of the p-toluene sulfonic acid solution and, again, no foaming or curing occurred.

In a last experiment, the second experiment was repeated but with the addition of 15 parts by weight of the p-toluene sulfonic acid solution. About 130 ml of the mixture was placed in a substantially cylindrical plastics mould having a diameter of 6.5 cm and a height of 20 cm and cured at room temperature to a hard fine-celled foam of uniform texture.

The above series of experiments was repeated but replacing the resole with a poly(alkylene ether) diol-containing aqueous resole having a solids content of 80% and a reactivity number of approximately 10 and sold commercially by C D F Chemie of France as "Norsophen" 1200 (Resole B) with the same results.

The series was repeated again using the following solids instead of talc and with the same results: plaster, fly ash, glass microspheres (Arimospheres from Bondaglass Voss Ltd of England).

EXAMPLE 2

A series of experiments were carried out employing the following ingredients and method:
resole: 100 parts of Resole A
hardener: 10 parts of Hardener solution X
solid (c): dry talc, used in Example 1, in various amounts as set out in the table below.

The resole was heated to 50° C. and then mixed with the designated amount of talc. The hardener was then mixed in and about 130 ml of the resultant mixture was poured into a substantially cylindrical plastics mould having a diameter of about 6.5 cm and a height of about 20 cm. The setting time (defined as the time between adding the hardener and the mixture setting hard) and the nature of the foam obtained were observed and recorded in the table below.

| Experiment | Amount of talc (parts by weight) | Setting time | Comments |
|---|---|---|---|
| A (Comparative) | 1 | 1.25 minutes | little or no foaming has occurred |
| D | 20 | 2.0 minutes | very fine celled foam of uniform structure; |
| E | 30 | greater than 10 minutes | excellent foam of very fine and uniform celled structure; lower density than D |
| F (Comparative) | 40 | no cure | too much solid (c) for the catalyst since the talc is slightly alkaline |
| G | 100[1] | 2 minutes | very fine low density foam and substantially lower density than E |
| H | 150[2] | not measured | the material was dough-like prior to curing. Excellent fine celled foam of uniform structure obtained. |

[1] 20 parts by weight of hardener used.
[2] 25 parts by weight of hardener used.

In all of experiments B to E, G and H, hard foams were obtained.

EXAMPLE 3

Experiment 2D was repeated but with varying amounts of hardener.
The results are set out in the table below.

| Experiment | Parts by weight of hardener | Setting time | Comments |
|---|---|---|---|
| J (Comparative) | 5 | no cure | insufficient catalyst due to slight alkalinity of talc |
| K | 10 | 1.0 minute | hard uniformed foam of moderate density |
| L | 15 | 0.75 minute | coarser foam than in K and the structure showing some signs of non-uniformity |
| M | 20 | 0.67 minute | texture of foam similar to C but the density of foam is greater |
| N | 30 | 0.5 minute | fairly dense foam with a less uniform structure than K, L, or M |
| P (Comparative) | 40 | explosion | setting occurred so fast that there was an explosion shortly after setting due to build up of gas pressure within hardened shell of resin. |

EXAMPLE 4

Experiment 3K was repeated but varying the temperature to which the resole is heated. The results are set out in the table below.

| Experiment | Temperature | Setting time | Comments |
|---|---|---|---|
| R (Comparative) | 90° C. | 0.6 minute | very large and non-uniform celled hard foam of coarse structure and low density. Not fully cured throughout. |
| S | 80° C. | 1.0 minute | slightly less coarse foam than R and uniformity improved. Density about the same as R. |
| T | 70° C. | 1.1 minutes | fairly fine uniformed textured hard foam of low density. |
| V | 60° C. | 1.3 minutes | good fine-celled and uniform foam slightly denser than that of Experiment T. |
| W | 50° C. | 1.5 minutes | hardly distinguishable from Experiment V. |
| X | 40° C. | 3.75 minutes | much denser foam than W but still of good texture. |
| Y | 30° C. | 7 minutes | good fine uniform-celled foam structure but denser than X. |

EXAMPLE 5

Two foams were prepared using the method and compositions of Examples 3L, and 3N except that the resole was at ambient temperature (22° C.).

In the first experiment (composition 3L) a dense but very fine uniform-celled hard foam was obtained. With composition 3N, the density of the foam was greater. In the third experiment, employing 50 parts by weight of hardener, the foam was even denser and the conditions were close to the explosive limit.

In the experiment with composition 3L, the setting time was 23 minutes and this was reduced to 7.75 minutes using composition 3N.

EXAMPLE 6 (Comparative)

Example 3K was repeated but preheating the resole to 110° C. Hardening was so rapid that no foaming occurred and it was impossible to properly dispersed the hardener so that curing was incomplete in parts of the mass.

EXAMPLE 9

100 parts of Resole A were heated to 45° C. and 80 parts of plaster (CBD Plaster obtained from British Gypsum Limited) were then thoroughly mixed in to the heated resole. 15 parts of Hardener X were then thoroughly mixed in and sufficient of the resultant mixture was added to a mould to fill it ⅓ full. The mould had a rectilinear cavity measuring 30 cm by 30 cm by 5 cm and was made from 2 grp sheets providing the 30 cm by 30 cm sides, the sheets being spaced apart by wooden spacers. The mould was positioned with the grp sheets vertical and the mixture was poured into the mould from the top which was then closed. The mixture expanded to thrice its initial volume.

A hard foamed block measuring 30 cm by 30 cm by 5 cm was obtained. The foam had a substantially uniform fine celled structure and low friability. Little or no dust was obtained by scratching the surface of the foam with a thumb nail.

The flame from a propane gas burner was applied to one face of the block and after 6 minutes, although the face was charred, the block still retained its integrity and the opposite face of the block was still sufficiently cool that a hand could be applied to it without discomfort.

The density of the foam was approximately 0.5 g/cc.

EXAMPLE 10

100 parts of Resole A were heated to 60° C. and 40 parts each of the plaster used in Example 9 and the talc used in Example 2 were thoroughly mixed in to the heated resole. 10 parts of Hardener solution X were then thoroughly mixed in and sufficient of the resultant mixture was poured in to a mould for the production of a roofing tile having the dimensions and shape of a Roman Pantile manufactured by Redland Limited of England. The tile size was approximately 40 cm by 31 cm with a maximum thickness of 2.5 cm. The mould was arranged so that the faces of the tile were vertical and the composition was poured into the mould from the top. A grp mould was used and the mould was warmed to about 50° C. prior to the addition of the mixture. The top of the mould was left open and the mixture was allowed to expand and overflow from the mould. The excess was then sawn off. The tile so obtained weighed approximately 1.3 kg and had the following properties:

K value: 0.025 to 0.03 W/m/° C.
Flexural Strength: approximately 7MN m$^2$
Resistance to acid: attacked only by strong acids of above N/I concentration
Resistance to alkali: attacked only by strong caustic alkalis of above N/I concentration
Action of ultra violet light: unattacked
Action of water: none
Weathering: a sand surfaced sample of the tile showed no effect as a result of weathering and no mould or dirt build up after 18 months exposure
Fire propagation test (British Standard 476 Part 6): satisfactory
Surface spread of flame (British Standard 476 Part 7): satisfactory (Class 1, no ignition)

EXAMPLE 11

Sufficient of the mixture described in Example 10 was added to a mould of the kind described in Example 9, but wherein the small dimension was reduced from 5 cm to 2.3 cm, to fill the mould ⅓ full. Prior to adding the mixture, the two 30 cm by 30 cm faces of the mould were coated with a curable phenolic resole gel coat and glass fibre. The resole was preheated to 60° C. but the mould was not heated. A sandwich panel was obtained comprising a foamed plastics core between two faces of glass fibre reinforced phenolic resin. This panel was subjected to the following tests with the results indicated:

Fire Propogation Test (British Standard 476 Part 6): satisfactory
Surface spread of flame (British Standard 476 Part 7): satisfactory (Class 1, no ignition)
Modulus of rupture: 5.7 mn/m$^2$
Tensile strength: 11,000 kg/m$^2$
Compressive strength: good

EXAMPLE 12

100 parts of Resole B was heated to 50° C. and 100 parts of a mixture comprising 40 parts of the plaster used in Example 9, 40 parts of the talc used in Example 2 and 20 parts of glass beads "Armospheres" obtainable from Bondaglass Voss Limited of England were thoroughly mixed in to the preheated resole followed by 10 parts of the hardener employed in Example 1. Sufficient of the mixture was added to a mould of the kind described in Example 9 but having the internal dimensions 32 cm by 32 cm by 2.5 cm, to fill the mould approximately ¼ full and the mould was then closed and the mixture allowed to expand to four times its initial volume and set to produce a very strong and rigid panel measuring 32 cm by 32 cm by 2.5 cm and having a substantially unfoamed skin. Removal of the skin showed that the core had a fine and uniform cell structure. The panel was suitable for use in building for load-bearing applications. It had a density of 0.55 g/cc. Substantially no dust could be obtained from the exposed foamed surface of the panel when scratched with a thumb nail, indicating a remarkably low degree of friability for a phenolic resin-based foam. Physical properties, thermal insulation and fire resistance are comparable with those of the products described in Examples 9, 10 and 11.

The panel could be sawn and machined and 6-inch nails could be hammered into it without any signs of splitting. The nails were very strongly retained by the panel. Screws could also be screwed into the panel by conventional means.

The panel thus had properties making it very suitable for use in the building and construction industry, particularly as a wood substitute.

EXAMPLE 13

A casting of a statuette of the Venus de Milo standing approximately 1.5 meters high was prepared from a foam-forming composition according to the invention using a vinyl-rubber mould supported in a grp casing, the mould being held head downwards and the composition being poured into the mould through an opening at the top. The composition was prepared by thoroughly mixing 100 parts of the plaster used in Example 9 into the same weight of Resole A and then adding 20 parts of Hardener solution X. The resin was not preheated and the mould was also at ambient temperature. Sufficient of the foam-forming composition was poured into the mould to fill it approximately ⅓ full and the composition was allowed to expand to about twice its initial volume and set at ambient temperature. There was a slight overflow from the top of the mould and this was removed. On demoulding, a statuette was obtained which followed very closely the contours of the mould and which had a non-porous, substantially continuous skin. Sectioning the statuette showed that it consisted essentially of a very fine-celled and substantially uniform foam with an un-foamed skin. Thus, from general examination of the statuette, it was not possible to tell that the core was foamed plastic. The statuette could be painted with ordinary or metal paints to give an attractive final effect.

EXAMPLE 14

A model of a human head was produced from the foam-forming composition of Example 10 (but preheating the resole to 40° C.), using a vinyl rubber mould supported in grp, such as is conventionally used in the production of mannequins and mannequin parts.

The head, which was approximately 20 cm high, was prepared by charging approximately 1.1 kg of the composition to the mould, closing it and then rotating the mould rapidly about two mutually perpendicular axes, as in a slush moulding technique.

The resultant head had a substantially unfoamed skin with a core of dense very fine and uniform celled foam. The contours of the mould were closely reproduced in the moulding, even in the complicated areas such as the ears.

EXAMPLE 15

A cylindrical block approximately 20 cm in diameter and 20 cm high was made from a foam-forming composition prepared by preheating 100 parts of Resole A to 50° C., thoroughly mixing into the preheated resole 60 parts of the talc used in Example 1 and 20 parts of the "Armospheres" used in Example 12, and then adding 10 parts of Hardener solution X. Approximately 1.5 liters of the composition were placed in a cylindrical mould having the dimensions of the required block and allowed to expand to approximately 4 times its original volume and set. The mould was left open at the top and there was a slight overflow of the foamed composition which was removed.

The resultant block exhibited particularly good energy absorption characteristics and was able to receive and hold tenaciously 6-inch nails hammered into it without any sign of cracking or splitting. The block also showed very good strength, thermal insulation properties and resistance to fire and the spread of flame. The block could, nevertheless, be sawn. Little or no dust was generated by scratching an exposed foamed surface of the block with a thumb nail.

EXAMPLE 16

100 parts of Resole B were heated to 50° C. and 120 parts of powdered lead obtained from Bondaglass Voss Limited of England were added to the preheated resole. 12 parts of the hardener used in Example 1 were then added and approximately 130 ml of the resultant mixture was allowed to foam and set in a substantially cylindrical plastics mould having a diameter of 6.5 cm and a height of 20 cm.

The product was a heavy black foam with a substantially continuous un-foamed skin. The product could be electroplated using conventional techniques.

EXAMPLE 17

A foam was prepared from approximately 130 ml of the mixture of Example 4W but using 50 parts of talc and 10 parts of hardener, in the mould described in the preceding Example. The resultant foam had a fine and substantially uniform texture.

In a second experiment, the procedure used in the first experiment was repeated with the same ingredients except that the resole was replaced by the same weight of an aqueous phenolformaldehyde resole having a solids content of approximately 77% and a reactivity number of 20. A product was obtained which was similar to that of the first experiment but it was more friable.

EXAMPLE 18

In a series of experiments, foamed products were obtained from compositions comprising Resole A, the hardener employed in Example 1 and a variety of finely divided solids. With each finely divided solid, a number of experiments were performed in which the resole was preheated to different temperatures within the range 30 to 80° C. and the amount of hardener was varied from $2\frac{1}{2}$ to 15 parts per 100 parts of resole. For all the finely divided solids employed, it was found that the preferred range of hardener was from 5 to 10 parts per 100 parts of resole and the preferred temperature range for preheating the resole was generally from 25 to 65° C. For the wheat flour, wood flour and powdered glass, however, the preferred temperature range for preheating the resole was 25° to 75° C. The finely divided solids employed in the experiments were as follows:
(a) plaster (CBD Plaster from British Gypsum Limited of England)
(b) talc (Talc 300 from English China Clay Company Limited of England)
(c) carbon black
(d) wheat flour (normal baking grade from McDougalls of United Kingdom)
(e) wood flour (120 mesh wood flour from Wood Treatment Limited of Macclesfield, England)
(f) powdered glass
(g) glass microspheres ("Armospheres" from Bondaglass Voss Limited of England).
(h) lead powder obtained from Bondaglass Voss Limited
(k) copper powder obtained from Bondaglass Voss Limited
(l) brass powder obtained from Bondaglass Voss Limited
(m) wood ash (powdered and dried)
(n) builders sand
(p) "Cementone" a colourant employed for products based on Portland cement
(r) "Alabastine" from Alabastine Limited of Welwyn Garden City, England
(s) table sale
(t) a powdered domestic detergent ("Vim" from Proctor & Gamble of United Kingdom)
(u) paint dust (the dried dust obtained from TKS paint)
(v) china clay obtained from English China Clay Company Limited All the above materials except the metal powders were dried prior to use.

Particularly good fine-textured and substantially uniform foams were obtained from wheat flour, wood flour, builders sand and the dried paint dust. The foamed product obtained from the builders sand was particularly notable for its hardness and its ability to resist exposure to flame, such as from a propane gas torch.

EXAMPLE 19

A composition comprising 100 parts of Resole B, 25 parts of the talc used in Example 1 and the hardener used in Example 1 was placed in an oven which had been preheated to 180° C. After about four minutes, when the temperature of the composition had reached about 50° C., foaming and setting occurred. The product was a substantially uniformly textured foamed product having a density lower than that obtained by allowing the composition to foam and set at ambient temperature.

EXAMPLE 20

The process of Example 19 was repeated but using 156 parts of the plaster used in Example 9 in place of the talc and an oven temperature of 80° C. After about 1 minute, when the temperature of the composition had reached about 30° C., foaming and setting occurred. A strong hard foam of uniform texture was obtained. Nails and screws driven into the foam were held fast in it.

EXAMPLE 21

Using the procedure described in Example 19, 100 parts of Resole B were mixed with 25 parts of the talc used in Example 1 and 5 parts of "Aniphen" a boron-based dehydrator sold commercially by CDF Chemie of France. 15 parts of the hardener used in Example 1 were then mixed in and the mould containing the resultant composition was placed in an oven at 200° C. After 2 minutes, when the temperature of the composition had reached about 50° C., foaming and setting occurred. The product was a large pored low density rigid foam suitable for use in packaging or thermal insulation.

EXAMPLE 22

The process of Example 21 was repeated but replacing the talc with other finely divided materials and using various oven temperatures. The results are tabulated below.

| Experiment | Finely Divided Material | | Oven Temperature | Product |
| --- | --- | --- | --- | --- |
| B | Powdered brass | 224 parts | 180° C. | foamed product with metallic sheen |
| C | Powdered copper | 150 parts | 180° C. | foamed product with metallic sheen |
| D | Lead Powder<br>Talc | 100 parts<br>25 parts | 130° C. | heavy foam. |

In all cases, foaming and setting occurred before the temperature of the composition had reached 60° C. All the metal powders were obtained from Bondaglass Voss Limited and the talc was that used in Example 1.

EXAMPLE 24

A mixture of 100 parts of Resole A, 25 parts of the talc used in Example 1 and 50 parts of a diol, HL 52, sold by Abrasive Products Ltd were heated in an oven at 170° C. for 10 minutes. The mixture was then removed from the oven and cooled to about ambient temperature. 15 parts of the hardener used in Example 1 were mixed in, and the resultant composition was placed in an oven at 120° C. Before the mixture reached 85° C., foaming and setting occurred and a rubbery foam was produced. The degree of rubberiness may be reduced by reducing the amount of HL 52, a suitable range generally being about 5–50 parts by weight.

Examples 19 to 24 above illustrate the production of foams according to the invention by heating the foam-forming composition and including the hardener in a mould in an oven. While foamed products were produced in all cases, this method was not as satisfactory as pre-heating the resole prior to addition of the hardener because of the difficulty of achieving uniform heating of the composition and accordingly a uniform texture through the foamed product.

EXAMPLE 25

Using the mould described in Example 12, a ceiling tile was obtained by first coating one of the opposed faces of the mould with a gel coat of phenolic resin/hardener mixture to a depth of 3 mm average and then applying a layer of chopped glass fibres and allowing the resin to cure and then, with the opposed faces vertical, pouring in a composition comprising Resole B (100 parts) which had been preheated to 40°–50° C., china clay (25 parts) and hardener used in Example 1 (15 parts) and allowing the whole to cure at room temperature. The result was a light-weight tile comprising a glass fibre backed gel coat face rigidified by a foamed resin backing.

EXAMPLE 26

A ceiling tile was obtained using the same mould as in Example 25 but the gel coat layer was obtained by painting on two layers of the resin/hardener mixture and chopped glass fibres were omitted. When the gel coat was tacky, the foamable mixture was poured in and allowed to foam and set without the application of heat, giving a light weight tile having an unfoamed face and a foamed backing. The exotherm from the foaming and setting of the foam-forming composition assisted in completing the cure of the gel coat.

EXAMPLE 27

Several foam forming compositions were prepared comprising Resole A preheated to 30°–40° C. (100 parts), plaster, talc or mixtures thereof (100 parts) and Hardener solution X (3.5 to 5 parts).

In a first series of experiments, these compositions were employed to form foamed boards having dimensions of up to 6 ft long by up to 2 ft wide and from ⅜ to 3 inches deep employing moulds formed of chipboard. The moulds were laid almost flat, i.e. plane of large dimensions substantially horizontal and a floating top plate was employed. The products were strong and hard and could be used for panelling, partitioning, ceilings and flooring.

In a second series of experiments, ceiling roses and lengths of moulded cornice were produced using rubber inserts providing the moulding details in grp mould cases, again with the moulds laid flat and again using a floating top plate. Excellent reproducibility of the mould design was obtained and the products could be cut, sawn and abraded like wood, painted and fixed to walls and ceilings using adhesives, nails or screws, i.e. generally employed as if they were made of wood.

In a third series of experiments laminated products approximately 9"×6"×1" thick were obtained by providing skins against one or both of the opposed large faces of a rectangular mould located with its large faces vertical. By this means laminates of the following constructions were obtained.
corrugated metal/foam/aluminium foil bronze powder filled polyester*/foam
lead powder filled polyester*/foam
bronze powder filled phenolic resin*/foam/glass fibre reinforced phenolic resin*
asbestos-reinforced bitumen sheet/foam.

The layers marked * were obtained by coating the mould face or faces with the curable liquid resin gel coat containing the filler mentioned and then adding the foam-forming composition to the mould. The heat generated by the foaming and curing reaction also cures the gel coat.

In another experiment, a rectangular open mould was placed with its large face substantially in the horizontal plane and brick slips were placed on the upward facing face of the mould in a pattern to simulate a brick wall, the slips, being located by spaces moulded into the mould face. On adding the foam forming composition and allowing it to foam and set a slab was obtained in which the slips were firmly bonded to the foam backing and having a face resembling that of a brick wall. The slab could be fixed to the outer wall of an existing building to improve the thermal insulation without detracting from its exterior appearance.

EXAMPLE 28

A. In a first experiment, 30 g of plaster sold by British Gypsum Ltd under the trade description "Fine Casting Plaster" were thoroughly dispersed at ambient temperature (20° C.) in 150 g of a resole having a reactivity number of approximately 11 and containing about 12% by weight of dipropylene glycol and available from Abrasive Products Ltd of Wolverhampton, England. 15 ml of a 67% by weight solution of p-toluene sulphonic acid in water was then thoroughly mixed in and the resultant mixture was poured into a 500 ml clear polypropylene beaker and allowed to foam and set at room temperature. The expansion was to approximately 10.5 times the original volume and the product was a pinkish fine celled foam of substantially uniform cell size being formed mainly of cells having a diameter in the range 0.2 to 0.6 mm with an average diameter of about 0.3 to 0.4 mm and a few cells having a diameter of about 0.8 to 1 mm. Foamed resin boards having useful thermal insulation and structural properties could be made from the same formulation using a suitable mould.

B. The above experiment was then repeated using 150 g of plaster and at an ambient temperature of 21° C. The expansion was to approximately six times the original volume and the product was a pinkish non-punking fine celled foam of substantially uniform cell size; being formed mainly of cells having a diameter in the range 0.2 to 0.8 mm with an average cell size of about 0.4 to 0.5 mm and a few cells of 1 to 1.5 mm. Foamed resin boards could be made from the same formulation using a suitable mould.

C. (Comparative) Experiment A was repeated again but without the addition of the plaster and at an ambient temperature of only 14° C. After an induction period of about three minutes, a vigorous foaming action commenced with the evolution of heat and vapour and the whole mass expanded and set solid in about 15 seconds to give a boiled resin with a coarse and highly non-uniform texture comprising largely cells varying in diameter from less than 0.1 to over 3 mm and many cells up to 5 mm in diameter. The product was valueless as a structural material.

D. (Comparative) Experiment C was repeated but 6 ml of a blowing agent, pentane, was mixed in with the acid hardener. A vigorous foaming action took place and the product was a very coarse and non-uniform foam with blow holes. The foam was very friable, had little compressive strength and punked.

E. Experiment D was repeated but with the inclusion of 30 g of the plaster used in Experiments A and B. The product was a fine-celled foam of substantially uniform cell structure, having cell diameters mainly in the range 0.1 to 0.5 mm, but the foam had a tendency to punk.

FIGS. 1 to 5 of the accompanying drawings are reproductions of photographs, at a linear magnification of approximately 2.5, of typical core sections of the foams produced by Experiments A, B, C, D and E, respectively, of Example 28.

EXAMPLE 29

A. The process of Example 28A was repeated but using a resole having a reactivity of about 2.6, and the temperature of the mixture of resole and plaster was adjusted to 20° C. prior to adding the acid. The mixture expanded to twice its original volume to yield a substantially uniform fine-celled fairly dense and non-punking foam in which most of the cells have a diameter of from 0.1 to 0.25 mm with a few having a diameter of 0.5 to 0.6 mm. Foamed resin boards having useful thermal insulation and structural properties could be made from the same formulation using a suitable mould.

B. Experiment A was repeated but using 150 g of the plaster and a temperature of 30° C. The mixture expanded to about 2.8 times its original volume to produce a substantially uniform and fine celled and non-punking foam in which most of the cells had a diameter of 0.3 to 1 mm with a very few having a larger diameter but not exceeding 2 mm. Foamed resin boards having useful thermal insulation and structural properties could be made from the same formulation using a suitable mould.

C. (Comparative) Experiment A was repeated but without the addition of the plaster. No foaming occurred and the mixture set to a solid unfoamed mass.

D. (Comparative) Experiment C was repeated but the resole was preheated to 40° C. before adding the acid hardener. The mixture set to a substantially unfoamed solid mass. There was slight bubbling around the periphery but almost no increase in volume.

E. (Comparative) Experiment D was repeated but with the resole preheated to 65° C. After a short induction period, a vigorous foaming action occurred with the strong evolution of heat and volatiles. The product was a boiled resin with a coarse and highly non-uniform texture similar to that of Example 28C. The product was valueless as a structural material and had a tendency to punk.

F. Experiment E was repeated but including 30 g of plaster. A fine-textured non-punking foam of substantially uniform cell size was obtained.

G. (Comparative) Experiment D was repeated with the inclusion of 6 ml of pentane as a blowing agent. The foam obtained was brittle and punked. Increasing the temperature to 50° C. yields a coarse-celled foam of nonuniform texture despite the presence of the pentane.

Figure 6:
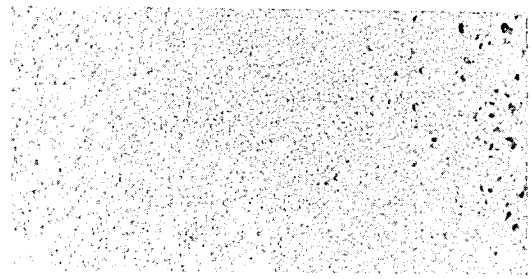
Figure 7:

FIGS. 6 and 7 of the accompanying drawings are reproductions of photographs, at a linear magnification of approximately 2.5, of typical core sections of the foams produced by Experiments A and B, respectively, of Example 29.

EXAMPLE 30

A fine-celled foam of substantially uniform cell size was obtained by repeating Experiment 28B but using a resole having a reactivity of approximately 1 and no added dihydric compound such as glycol, and available from Borden Chemicals as P 963/A, and heating the resole to 50° C. prior to adding the plaster.

We claim:

1. A method for the production of a foamed phenolic resin material comprising
   (i) effecting a curing reaction between
   (a) a liquid phenolic resole containing not more than 35% by weight of water and having a reactivity number of at least 1, where reactivity number is defined as 10/x where x is the time in minutes required for a mixture of 5 ml of the resole and 10% by weight of the resole of a 66–67% aqueous solution of p-toluene sulfonic acid to become hard to the touch after the mixture has been prepared in a test tube and the test tube containing the mixture has been immersed in a water bath which is at 60° C., and
   (b) an amount of a strong acid suitable as a hardener for said resole which is equivalent to 2 to 20 parts, per 100 parts of the phenol/aldehyde condensation product in the resole, by weight, of p-toluene sulfonic acid, in the presence of
   (c) a finely divided inert and insoluble particulate solid which has a particle size of 0.5 to 800 microns and is present in an amount of from 20 to 250% by weight of the liquid resole and is substantially uniformly dispersed through the mixture of resole and hardener; and optionally
   (d) a compound having two active hydrogen atoms and capable of reacting with the phenol/aldehyde condensation product in the resole,
   the temperature of the mixture containing resole and hardener due to any applied heat not exceeding 85° C. and said temperature and the concentration of the acid hardener being such that at least one compound present in the resole or generated as a by-product of the curing reaction is volatilized within the mixture whereby to cause the mixture to foam before the mixture sets, and
   (iii) recovering a foamed phenolic resin product having a cellular texture of substantially uniform cell size and being substantially free of blow holes,
   wherein the mixture of liquid phenolic resole, hardener and particulate solid includes an added blowing agent in a small amount insufficient to have an adverse effect on the foaming reaction and insufficient to achieve a foamed product when used by itself.

2. A method as claimed in claim 1 in which the amount of blowing agent does not exceed about 2.5 parts per hundred parts of the resole, by weight.

3. A method as claimed in claim 1 wherein the compound having tow active hydrogen atoms is selected from the group consisting of ether diols and alkylene glycols.

4. A method as claimed in claim 1 in which the compound having two active hydrogen atoms is present in an amount of up to 35% by weight of the phenol/aldehyde condensation product in the resole.

5. A method as claimed in claim 1 wherein the phenol/aldehyde condensation product component of the resole is formed by the reaction of formaldehyde with phenol in a molar ratio of 1.25–2.5:1.

6. A method as claimed in claim 1 wherein the resole has a reactivity number of at least 5.

7. A method as claimed in claim 6 wherein the resole has a reactivity number of at least 10.

8. A method as claimed in claim 1 in which the finely divided particulate solid has a particle size in the range 1 micron to 100 microns.

9. A method as claimed in claim 1 in which the finely divided particulate solid is selected from the group consisting of talc and fly ash.

10. A method as claimed in claim 1 in which the finely divided particulate solid includes a hydraulic cement other than Portland cement.

11. A method as claimed in claim 10 in which the hydraulic cement is selected from the group consisting of plaster and gypsum.

12. A method as claimed in claim 1 in which the particulate solid is present in an amount of from 50 to 150 parts per 100 parts of the resole.

13. A method of obtaining a foamed phenolic resin by curing a phenolic resole comprising phenol/aldehyde condensation product under conditions such that at least one volatilisable compound which is a component of the resole and/or is formed as a by-product of the curing reaction is volatilised before the resole has solidified, and wherein the boiling of the resole which leads to the production of a coarse and non-uniform cellular structure containing blow holes is at least substantially suppressed by employing a liquid phenolic resole containing not more than 35% by weight by water and having a reactivity number of at least 1, where reactivity number is defined as 10/x, and x is the time in minutes required for a mixture of 5 ml of the resole and 10% by weight of the resole of a 66–67% weight aqueous solution of p-toluene sulfonic acid to become hard to the touch after the mixture has been prepared in a test tube and the test tube containing the mixture has been immersed in a water bath which is at 60° C., and effecting a curing reaction between said resole and an amount of a strong acid hardener equivalent to from 2 to 20 parts, per 100 parts of the phenol/aldehyde condensation product in the resole, by weight, of p-toluene sulfonic acid, in the presence of an amount in the range of 20% to 250% by weight of the liquid phenolic resole of a finely divided inert and insoluble particulate solid which has a particle size in the range of 0.5 to 800 microns and which is substantially uniformly dispersed through the mixture of resole and hardener, further in the presence of an added blowing agent in an amount insufficient to have an adverse effect on the foaming reaction and insufficient to achieve a foamed product when used by itself, and optionally in the presence of a compound having two active hydrogen atoms and capable of reacting with the phenol/aldehyde condensation product in the resole, the temperature of the mixture containing said resole and said acid hardener due to any applied heat being in the range 10° to 65° C., whereby a solid foamed phenolic resin product having a cellular texture of substantially uniform cell size substantially free of blow holes is formed.

14. A method as claimed in claim 13 in which the amount of blowing agent does to exceed about 2.5 parts per 100 parts of the resole, by weight.

* * * * *